Dec. 24, 1963     A. W. CHEEK     3,115,546
WAVEFORM GENERATOR

Filed April 2, 1962     2 Sheets-Sheet 1

INVENTOR.
ALAN W. CHEEK
BY Sidney Magnes
AGENT

Dec. 24, 1963  A. W. CHEEK  3,115,546
WAVEFORM GENERATOR
Filed April 2, 1962  2 Sheets-Sheet 2

INVENTOR.
ALAN W. CHEEK
BY *Sidney Magnes*
AGENT

United States Patent Office 3,115,546
Patented Dec. 24, 1963

3,115,546
WAVEFORM GENERATOR
Alan W. Cheek, Long Beach, Calif., assignor to
North American Aviation, Inc.
Filed Apr. 2, 1962, Ser. No. 184,362
4 Claims. (Cl. 178—7.2)

This invention relates to a waveform generator; and more particularly to apparatus that produces a voltage whose amplitude varies in accordance with the shape of a line that is drawn, printed, or photographed on a sheet of material.

Background

When a graph is made of the way in which a voltage changes with respect to time, this graph is known as the "waveform" of the voltage. If this waveform resembles the teeth of a saw, it is known as a "sawtooth" waveform. Similarly if the waveform resembles a series of triangles, it is known as a "triangular waveform." Waveforms may resemble other geometrical figures, such as rectangles, sine waves, and the like; and waveform-generating circuitry for producing waveforms corresponding to a number of geometrical figures, is well known.

When, however, it is desirable to produce a waveform that contains a plurality of different geometrical figures, or a waveform that does not contain any particular geometrical figures, but is rather arbitrary, it is extremely difficult to design circuitry for accomplishing this result. For convenience, this type of waveform will be designated as "irregular."

As may be expected, it is frequently necessary to produce electrical signals corresponding to irregular voltage waveforms. It may be discovered during tests, that a new aircraft has a particular type of vibration that is detrimental to the operation of particular equipment; and that the equipment must be re-designed to operate properly despite this vibration. It is of course impractical to design and test the equipment in the aircraft; so it is highly desirable to be able to reproduce this vibration in the laboratory, where the equipment can be tested and re-designed in conjunction with this vibration. This result can be achieved by producing an electrical signal having the characteristic of this vibration, and applying this electrical signal to a vibration table; in this way producing, in the laboratory, the same vibration that is present in the aircraft. The equipment may then be suitably designed and tested.

Another situation arises when equipment is to be designed for use with a particular electric generator, and the response curve of the generator is specified. For example, when the generator is loaded suddenly, it slows down momentarily, and then as the regulating circuits come into play, the rotation is increased to its desired speed. During this transient time the frequency of the signal produced by the generator varies; and it is necessary that the equipment should be designed to operate properly under this change of frequency. Similarly, as the generator slows down and then regains speed, the voltage of the output signal is changed. It is also necessary that the equipment to be operated from this generator should operate properly under the changing voltage conditions. Since generators of this type are not always available when equipment is being designed and tested, it is desirable to reproduce the frequency and voltage variations in the laboratory; and a waveform generator to produce these irregular waveforms is particularly desirable.

It will be understood that the irregular waveforms corresponding to these vibrations, and frequency and voltage changes can be displayed on the faceplate of an instrument known as an oscilloscope, whose display may then be photographed or traced. Alternatively, the irregular waveform may be drawn or copied onto a sheet of paper or transparent material.

Objects and Drawings

It is therefore the principal object of my invention to provide an improved waveform generator.

It is another object of my invention to provide a waveform generator whose output may be made to correspond to any irregular waveform.

It is a further object of my invention to provide a waveform generator whose output corresponds to the shape of an irregular waveform drawn upon a suitable sheet of material.

The attainment of these objects and others will be realized from the following specification taken in conjunction with drawings, in which—

Brief Description of the Invention

Broadly stated, my invention contemplates circuitry wherein a graph of the irregular waveform causes the circuitry to produce an output waveform having a corresponding shape. As will be shown, this irregular waveform may be drawn upon a transparent material, or upon an opaque material; in either case the output of the circuitry being such as to correspond to the drawn waveform.

Detailed Description of the Invention

Figure 1:
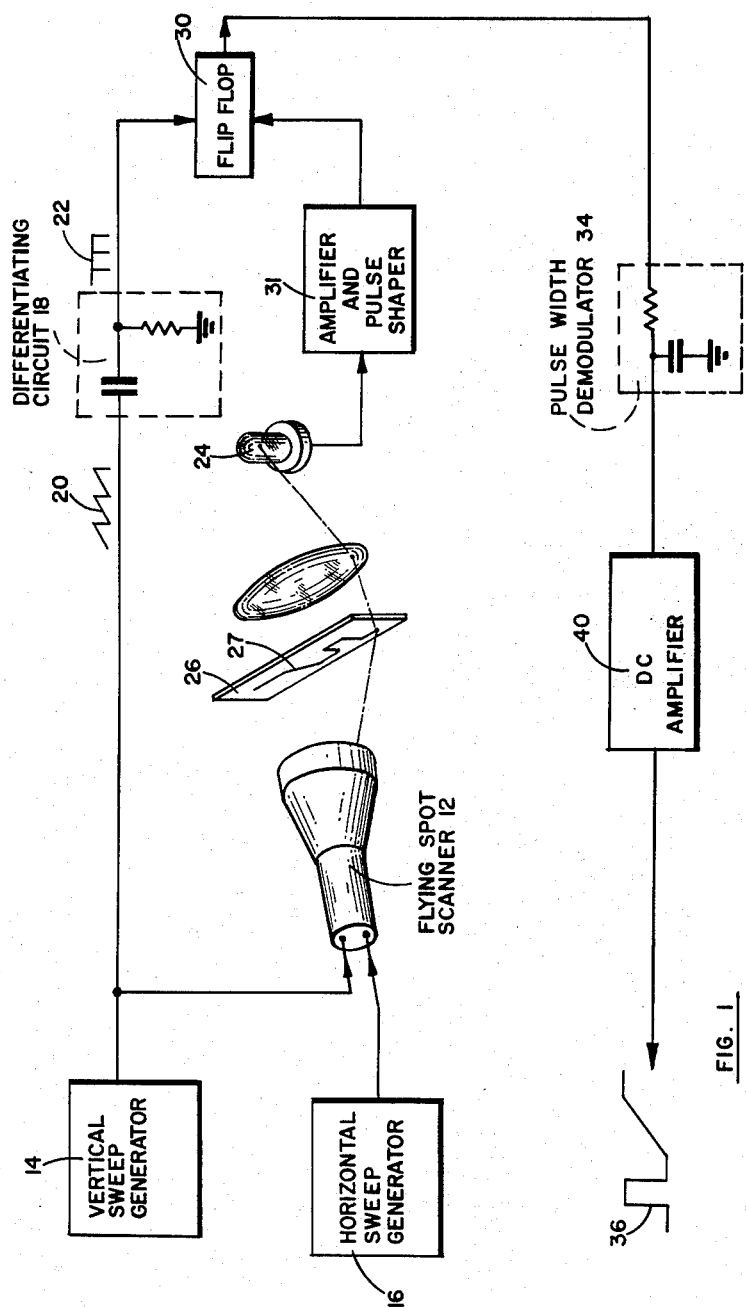
FIGURE 1 shows a schematic diagram of my invention.

The basic concept of my invention will be better understood from a study of FIGURE 1. For convenience, this will be explained using a drawing of the irregular waveform on a transparent sheet of material.

FIGURE 1 shows a flying spot scanner 12, that is well known in the art. Briefly stated, it comprises a cathode ray tube similar to a television tube, wherein a spot of light moves across the faceplate of the tube, retraces to form a second line directly below the first, and then forms a third line directly below the second. This process is continued, and the spot of light produces a series of parallel scanning lines that cover the entire faceplate of the tube.

My flying spot scanner 12 is modified so that the scanning lines are vertical rather than horizontal, and are formed in a left-to-right sequence rather than a top-to-bottom sequence. In order to produce this type of movement of the spot of light, a vertical sweep generator 14 and a horizontal sweep generator 16 are used in a manner well known to those in the art.

A portion of the output of vertical sweep generator 14 is also applied to a differentiating circuit 18. This circuit has the characteristic that when a sawtooth waveform such as 20 is applied thereto, the output is a waveform 22 comprising a series of downwardly-extending "spikes" that occur at the start of each line; each of these spikes being used as a triggering signal in a manner to be described later.

In accordance with my invention, I position in front of the flying spot scanner 12, and between it and the photosensitive tube 24, a drawing 26 of the desired irregular waveform 27; the drawing being on a transparent material.

For convenience, an exemplar irregular waveform 27 is shown as comprising a rectangle, a ramp, and straight lines; but is not to be construed as a limitation of the type of irregular waveform that may be used.

Figure 2:
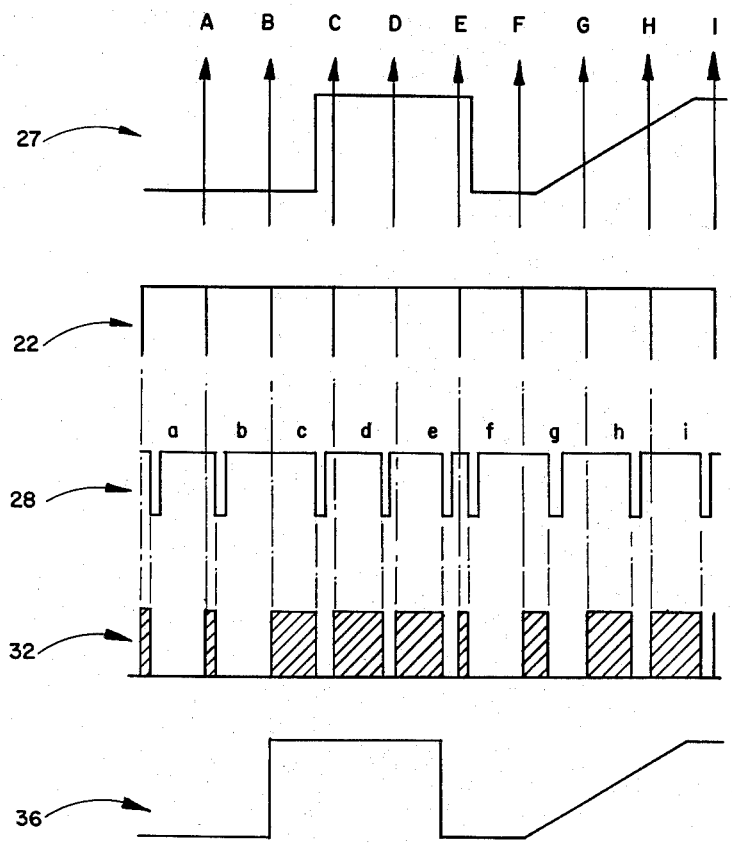
FIGURE 2 shows a plurality of waveforms associated therewith.

FIGURE 2 shows the irregular waveform 27; exemplar paths A, B, C, . . . along which the spot of light moves upwards; and the differentiated spiked waveform 22.

As the spot of light sweeps upwards, the opaque line of the drawing 27 intercepts and modifies the light, and prevents it from reaching the phototube; and the output of the photosensitive tube is therefore decreased as shown by the downwardly extending pulses of waveform 28. As may be seen, the spot of light rises a short distance along path A before it is interrupted; and therefore the first downwardly extending pulse of waveform 28 appears a short distance to the right of the starting point. As the spot of light moves upward along line B, it is also intercepted by the drawing of the irregular waveform at a relatively early time; and the resultant downwardly extending pulse occurs relatively soon. As the spot of light sweeps upward along path C, it is intercepted quite late in its path by the line on surface 26; waveform 28 showing the decreased output of the photosensitive cell. It will be noted that as the spot sweeps upward along paths D and E, it traverses almost its entire path before being blocked out. In traversing path F the light beam is interrupted relatively early in its path, whereas along paths G, H, and I it is interrupted progressively later.

I use the negative-going spikes of waveform 22 to trigger a bi-stable arrangement, such as a flip-flop circuit 30, to its On position; while the negative-going pulses produced by impingement of the modified light onto the photocell are amplified and shaped by circuit 31, and are used to trigger flip-flop 30 to its Off position.

Waveform 32 shows the varying condition of the flip-flop circuit. As may be seen, it alternates between its upper On and its lower Off position. The duration of the On positions is indicated by the width of the upwardly directed pulses, cross-hatched for clarity.

The output of the flip-flop is passed thru a pulse-width demodulator 34 that produces an electrical signal whose amplitude varies with the width of the positive-going pulses of waveform 32.

It will be noted that output waveform 36 is a reasonably exact replica of the original irregular waveform 27; the discrepancy being caused by the fact that paths A, B, C, . . . are widely spaced apart. Since in an actual flying spot scanner the lines may be only 1/1000 of an inch apart, the actual output is a substantially accurate reproduction of the drawn irregular waveform.

Output waveform 36 may be applied to a D.C. amplifier 40, which amplifies the waveform 36 to any desired degree.

As may now be realized, my invention produces an output waveform that corresponds in shape to the irregular waveform drawn on sheet 26; the output waveform having a selected amplitude.

There are times when the duration of the arbitrary waveform may be required to have a definite time interval, such as one second. If the flying spot scanner required one second to scan the entire irregular waveform, this would mean that the length of the output waveform would be of the desired interval. If however the output waveform is desired to have a time of a half a second, this result can be achieved in two ways. The first would be to draw the waveform so that it required only half the width of the faceplate of the flying spot scanner. The other way would be to increase the speed of the horizontal sweep generator 16, so that it required only a half a second to scan the drawing on the sheet 26.

My disclosed invention has the advantage that the irregular waveform may be hand-drawn on a transparent piece of plastic, glass, or the like, by means such as crayon, ink, or black pencil. The width of the drawn line is not important, because it is the edge of waveform 27 that triggers the flip-flop to its Off position.

Alternatively, the drawing may be on an opaque backing, and the light reflected therefrom to the pickup device 24.

Although the invention has been described and illustrated in detail, it is to be clearly understood that the same is by way of illustration and example only and is not to be taken by way of limitation, the spirit and scope of this invention being limited only by the terms of the appended claims.

I claim:
1. Apparatus for producing an electrical signal corresponding to an irregular waveform comprising:
   a cathode ray tube scanning device;
   means, comprising a sweep generator, for operating said cathode ray tube scanning device;
   means for differentiating the output of said sweep generator;
   a bi-stable arrangement;
   means for causing the differentiated signal to trigger said bi-stable arrangement to one of its stable states;
   means for modifying the light from said scanning device in accordance with said irregular waveform;
   means for causing said modified light to trigger said bi-stable arrangement to its other stable state—whereby the duration of said one state of said bi-stable arrangement varies in accordance with said irregular waveform; and
   means for converting the output of said bi-stable arrangement to an electrical signal corresponding to said irregular waveform.

2. Apparatus for producing an electrical signal corresponding to an irregular waveform comprising:
   a flying spot scanner;
   means, comprising a vertical sweep generator, for operating said flying spot scanner;
   means for differentiating the output of said vertical sweep generator;
   a flip-flop circuit;
   means for causing the differentiated signal to trigger said flip-flop to one of its stable states;
   means for causing the light from said scanner to be modified in accordance with said irregular waveform;
   means for causing said modified light to trigger said flip-flop to its other stable state—whereby the duration of one state of said flip-flop varies in accordance with said irregular waveform; and
   means for converting the output of said flip-flop to an electrical signal corresponding to said irregular waveform.

3. Apparatus for producing an electrical signal corresponding to an irregular waveform on a sheet of transparent material, comprising:
   a flying spot scanner;
   means, comprising a vertical sweep generator, for operating said flying spot scanner;
   means for differentiating the output of said vertical sweep generator;
   a flip-flop circuit;
   means for causing the differentiated signal to trigger said flip-flop to its On state;
   a photosensitive pickup device;
   means for causing the light from said scanner to scan said irregular waveform and impinge upon said photosensitive pickup device—whereby the output of said photosensitive device varies in accordance with said irregular waveform;
   means for causing the output of said photosensitive device to trigger said flip-flop to its Off state—whereby the duration of the On state of said flip-flop varies in accordance with said irregular waveform; and
   means comprising a pulse-width demodulator for converting the output of said flip-flop to an electrical signal corresponding to said irregular waveform.

4. Apparatus for producing an electrical signal corresponding to a hand-drawn irregular waveform on a sheet of transparent material, comprising:

a flying spot scanner wherein the spot of light produces vertical scanning lines;

means, comprising a vertical sweep generator, for operating said flying spot scanner;

means for differentiating the output of said vertical sweep generator;

a flip-flop circuit;

means for causing the differentiated signal to trigger said flip-flop to its On state;

a photosensitive pickup device;

means for causing the light from said scanner to transverse said sheet of material and impinge upon said photosensitive pickup device—whereby said light is modified in accordance with said irregular waveform;

means comprising a pulse shaper for causing the output of said pickup device to trigger said flip-flop to its Off state—whereby the duration of the On state of said flip-flop varies in accordance with said irregular waveform;

means comprising a pulse-width demodulator for converting the output of said flip-flop to an electrical signal corresponding to said irregular waveform.

No references cited.